Dec. 3, 1946.    W. S. WILSON    2,412,111

MEASUREMENT OF TIME BETWEEN PULSES

Filed Dec. 30, 1943

Inventor
William S. Wilson
By
C. D. Tuska
Attorney

Patented Dec. 3, 1946

2,412,111

UNITED STATES PATENT OFFICE 2,412,111

MEASUREMENT OF TIME BETWEEN PULSES

William S. Wilson, Haddonfield, N. J., assignor to Radio Corporation of America, a corporation of Delaware Application December 30, 1943, Serial No. 516,205

5 Claims. (Cl. 161—15)

The invention relates to the measurement of the time between the occurrence of two pulses of electrical energy. Expressed somewhat differently, it relates to the measurement of the phase angle or phase difference between two such pulses.

The invention will be described with particular reference to its use in an aircraft altimeter of the type in which intermittent pulses of radio-frequency energy are radiated from a transmitter situated in the aircraft, and are reflected from the ground back to a receiver also situated in the aircraft, the receiver being adapted to be actuated by such reflected pulses. If the respective outputs of the transmitter and receiver are applied to a device for the measurement of the phase difference between them, it is by this means possible to measure the time which a pulse sent out by the transmitter takes to travel to the ground and back to the receiver. Since the velocity of the pulses is known, this is also a measure of the distance from the aircraft to the ground.

While the invention is applicable to any two pulses of electrical energy (whether radiated or not) which vary in phase with respect to each other, such pulses will, for convenience, be referred to in this specification as a "transmitted pulse" and a "reflected pulse," respectively.

In altimeters of the type described, the transmitted and reflected pulses are often applied to an oscilloscope, the screen whereof is calibrated in terms of either phase angle or altitude.

Apparatus of this type, in which an oscilloscope or similar device is used, occupies considerable space. In such apparatus high voltages (of the order of 1600 to 1700 volts) are used; and it is sometimes difficult to read the indications of altitude on the screen of the oscilloscope.

It is, therefore, an object of the invention to provide compact and inexpensive apparatus for measuring the phase difference between two pulses of radio-frequency energy.

It is a further object of the invention to provide an improved method of, and apparatus for, measuring the phase difference of discrete pulses.

A further object of the invention is to provide an improved method of, and apparatus for, measuring distance between two objects.

A further object of the invention is to provide improved distance measuring apparatus, using much lower voltages than heretofore, and an easily readable distance indicator.

A further object of the invention is to provide an improved method of, and apparatus for, measuring the phase difference between two pulses of radio-frequency energy utilizing only direct current measuring instruments.

According to the invention, the transmitted and reflected pulses are applied respectively to the control electrodes of a pair of thermionic tubes connected in such a way as to produce in the anode circuit of one of the tubes a square voltage wave, the time duration of which is proportional to the phase difference between the pulses. A direct current reading milliammeter, connected in series with a resistor in such anode circuit, or a direct current reading voltmeter, connected in parallel with such a resistor, is then all that is needed to measure the phase difference.

The invention will now be described in detail with reference to the accompanying drawing, in which.

Figure 1:
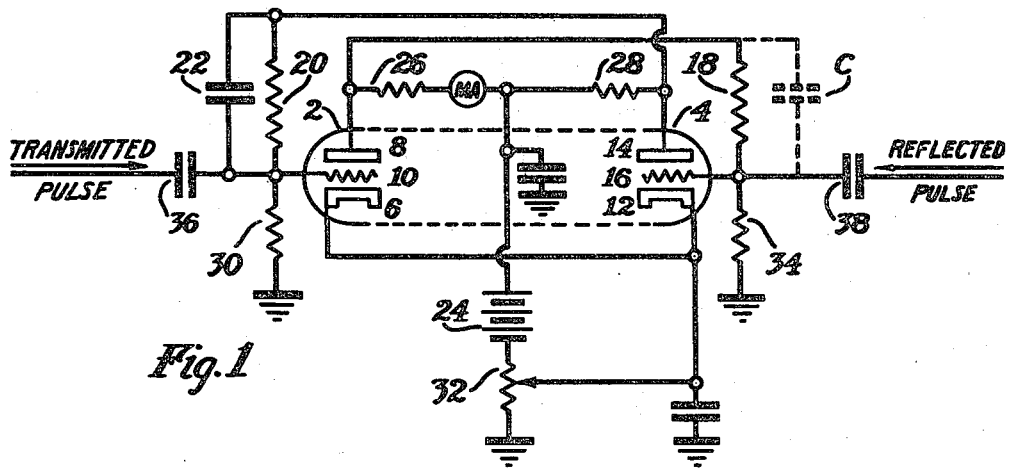
Figure 1 is a circuit diagram of an embodiment of the invention.

Referring to Fig. 1, a first thermionic tube 2 and a second thermionic tube 4 are arranged in a single envelope, but may be disposed in two envelopes. In a preferred embodiment, I have used a twin triode, RCA type 6J6. One tube 2 has a cathode 6, an anode 8 and a control electrode 10. Similarly, the other tube 4 has a cathode 12, an anode 14 and a control electrode 16. The anode 8 of the first tube is connected to control electrode 16 through the coupling resistor 18. The anode 14 of the second tube is connected to control electrode 10 through coupling resistor 20. In parallel with coupling resistor 20 is a condenser 22, the combination of the resistor 20 and the condenser 22 constituting a time element device. The anode 8 is connected to a source of potential 24 through a load resistor 26, and the other anode 14 may be connected to the same source of potential through a load resistor 28. In a preferred embodiment, 300 volts were applied to the respective anodes. Bias for the control electrode 10 is provided by a grid leak resistor 30 and by a tapped resistor 32 (which may be in the cathode circuit of both tubes), and by the coupling resistor 20. Similarly, bias for the other control electrode 16 is provided by a grid leak resistor 34, the tapped resistor before referred to, and the coupling resistor 18.

The transmitted pulse is applied to the control electrode 10 through a coupling condenser

3

36; the reflected pulse is applied to the control electrode 16 through a coupling condenser 38.

Figure 2:
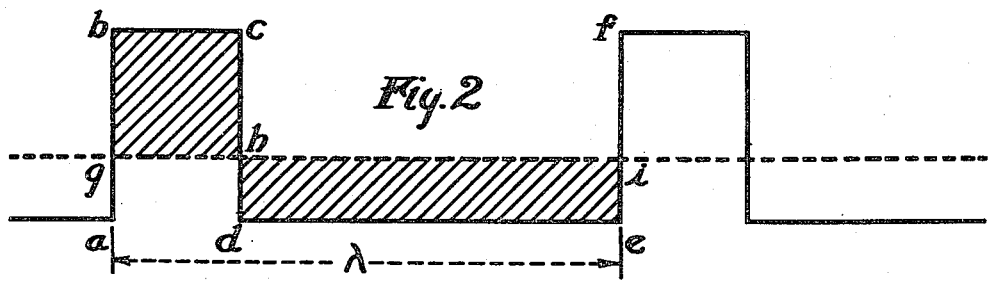
Figure 2 represents the square wave produced in the anode circuit of one of the tubes.
Figure 3:
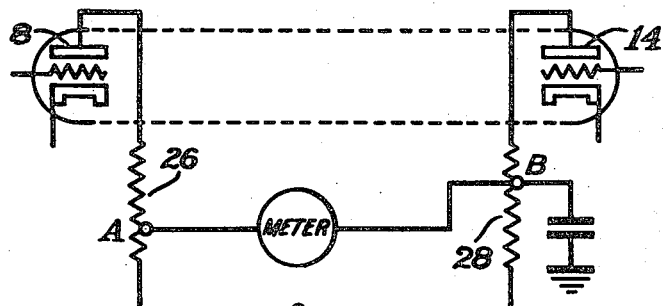
Figure 3 is a circuit diagram illustrating an alternative embodiment of the invention.

The operation of the circuit may be explained as follows: Application of the transmitted pulse 2 to the control electrode 10 drives the first tube towards cut-off. This reduces current flowing in the anode circuit of the first tube 2 and increases the voltage of the anode circuit of the first tube 2 at this point, that is nearly straight, would anode circuit of an oscilloscope, for example, would show a line a—b (see Fig. 2) going nearly straight upwards. Since the anode 4 is connected to tube 2 control electrode 16, bias on the anode circuit reduced, causing current to rise and this, in turn, is reflected back to the anode 14 across the resistor 20 and the condenser 22. The voltage decrease distributed primarily through the condenser 22 in the ratio across it. The condenser that the control electrode 16, indicated in Fig. 1 by the dotted lines, and this distributed capacity, combination corresponds to the condenser 26 in the constant of the control electrode 34, 18 and 26 constitute a made large by comparison to the repetition time of the control element combination time element combined with the control electrode, voltage in the discharge voltage may be

4 the repetition led to the control der placed across e 8 to ground, wit will settle itself area of shaded rec ea of shaded w-ea, will vary w the pulses applied 16, respectively. the repetition re will become s epresenting such e ways stay in Fig. rectangles in such therefore, that th the first tube difference of e control elec voltmeter connected respective phase difference voltage ammeter MA, placed 26, will respond to th of the anode curre 25  should be placed on 26.

An alternative ammeter MA is nection has the steady current 30  of the tubes 1 of pulses. W the control electro trol current anode curre through the 35  cuits of the resistors drops fro source a meter is 40 of coupling between the two circuits, constituted by the resistors and condenser in the anode and control electrode circuits of the two tubes.

To achieve this unbalance, I have used the following values of circuit elements in a preferred embodiment:—For the coupling condensers, 36 and 38, 20 micro-micro-farads and 100 micro-micro-farads respectively; for the coupling resistors 20 and 18, 22,000 ohms and 18,000 ohms respectively; for the grid leak resistors 30 and 34, 120,000 ohms and 900,000 ohms respectively; for the load resistors 26 and 28, 130,000 ohms and 30,000 ohms respectively; for the condenser 22, 85 micro-micro-farads, and for the tapped resistor 32, 24,000 ohms.

I have thus described a method and compact apparatus utilizing direct current measuring instruments only and comparatively low voltages, by the use of which phase difference between pulses of radio-frequency energy may be easily observed. The application of the invention to altimeters and other distance measuring devices has already been referred to, but it will be apparent to those skilled in the art that the invention is applicable in any case where it is necessary or desirable to measure a phase difference between two electrical pulses, whether radiated or not, and to use comparatively inexpensive apparatus for such purpose.

I claim as my invention:

1. Apparatus for measuring the phase difference between two pulses of electrical energy, comprising in combination a first thermionic tube and a second thermionic tube, each of said tubes having a control electrode for the application thereto of said pulses respectively, the anodes of each of said tubes being connected through coupling resistors to the control electrodes of the other of said tubes, a time element device including a resistance and parallel condenser in each of said control electrode circuits, the time constant of the time element device of said first tube being greatly in excess of the time element device of the second tube, and means for measuring any change in the average anode output of said first tube.

2. Apparatus according to claim 1, characterized in that said output measuring means are connected to resistors in the anode circuits of said tubes at such points that said measuring means will give a zero reading when said pulses are in phase.

3. Apparatus for measuring the phase difference between two pulses of radio-frequency energy, comprising in combination a first thermionic tube and a second thermionic tube, each of said tubes having a control electrode for the application thereto of said pulses respectively, a time element device in the circuit of each of said control electrodes, the time constant of the time element device of said first tube differing greatly from the time constant of the time element device of said second tube, and means for measuring any change in the average anode output of said first tube.

4. The device of claim 3 in which the time constant of the time element device in the circuit of the control grid of the first tube is in excess of the time constant of the time element device associated with said second tube.

5. Apparatus for measuring the phase difference between two pulses of radio frequency energy, comprising in combination a first thermionic tube and a second thermionic tube, each of said tubes having a control electrode for the application thereto of said pulses respectively, the anodes of each of said tubes being connected through coupling resistors to the control electrodes of the other said tubes, a time element device in each of said control electrode circuits, the time constant of the time element device of said first tube being greatly in excess of the time constant of the time element device of the second tube, and means for measuring any change in the average anode output of said first tube.

WILLIAM S. WILSON.